Jan. 5, 1943. F. T. SONNE 2,307,646
CAMERA
Filed Oct. 26, 1940 4 Sheets-Sheet 1
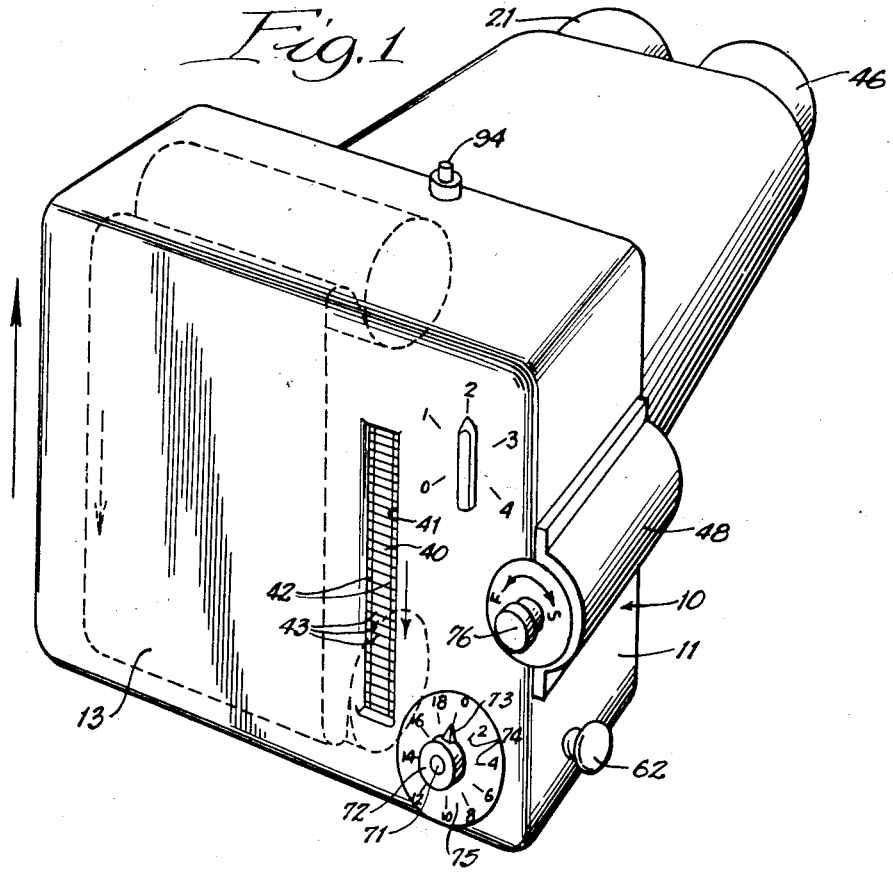
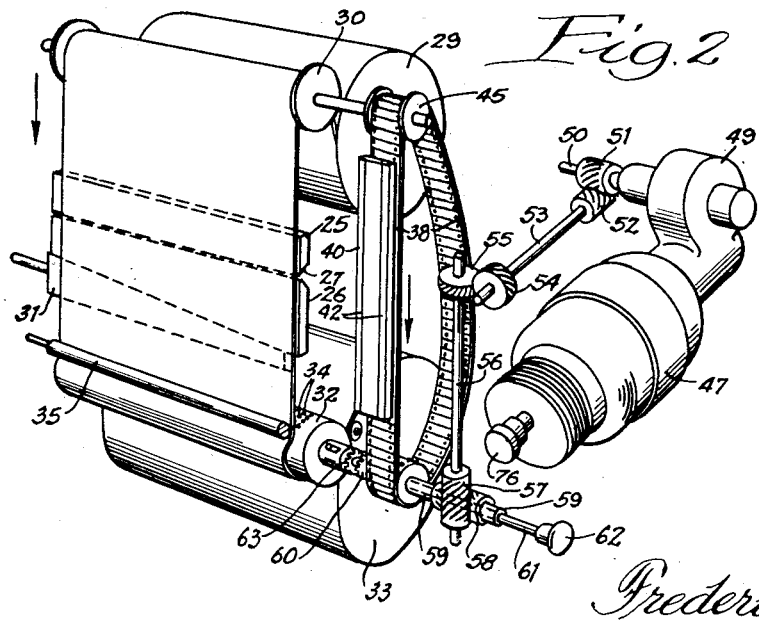
Inventor:
Frederick T. Sonne,
By Banning & Banning
Attorneys.

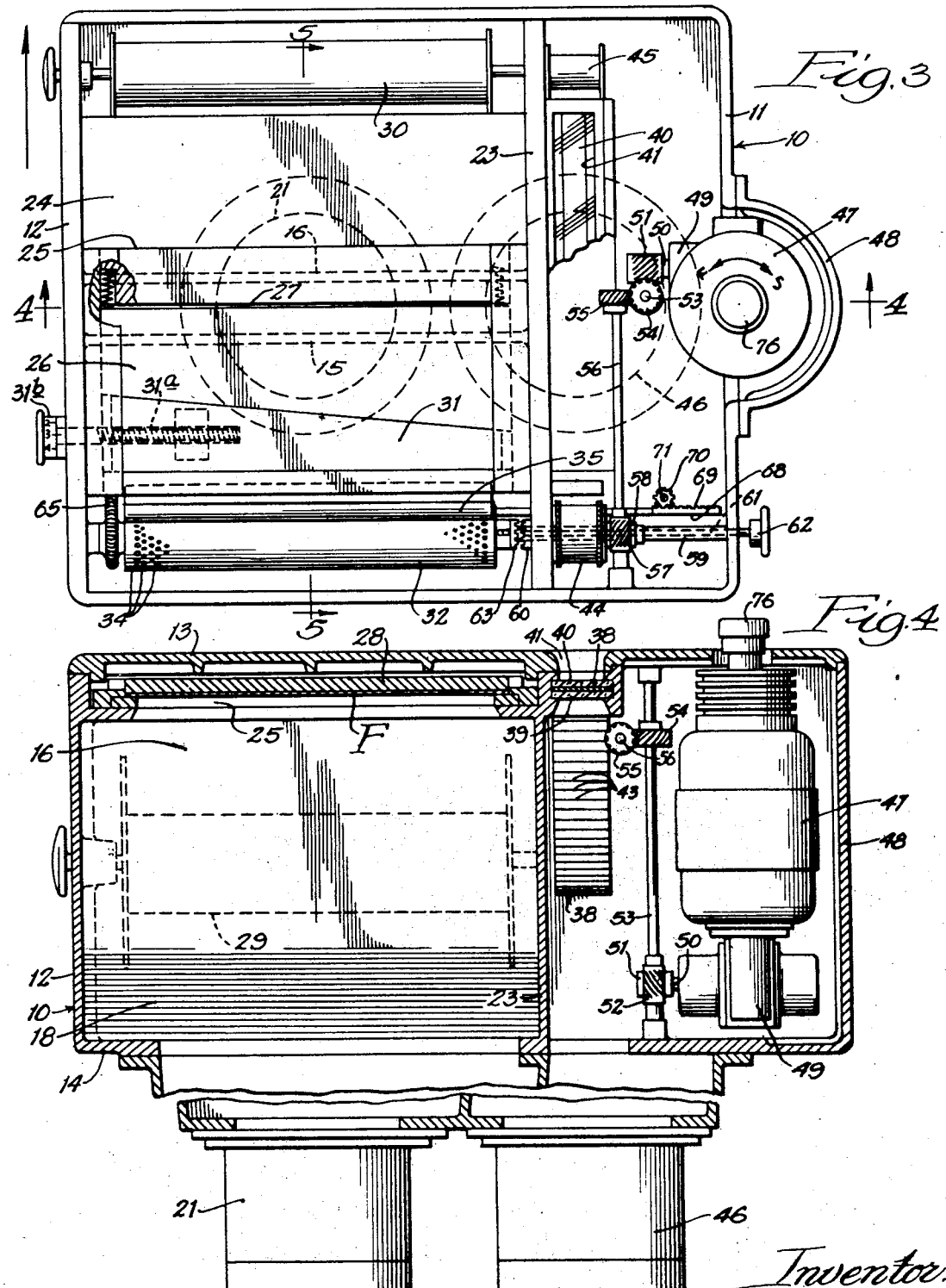

Jan. 5, 1943.      F. T. SONNE      2,307,646
CAMERA
Filed Oct. 26, 1940      4 Sheets-Sheet 3
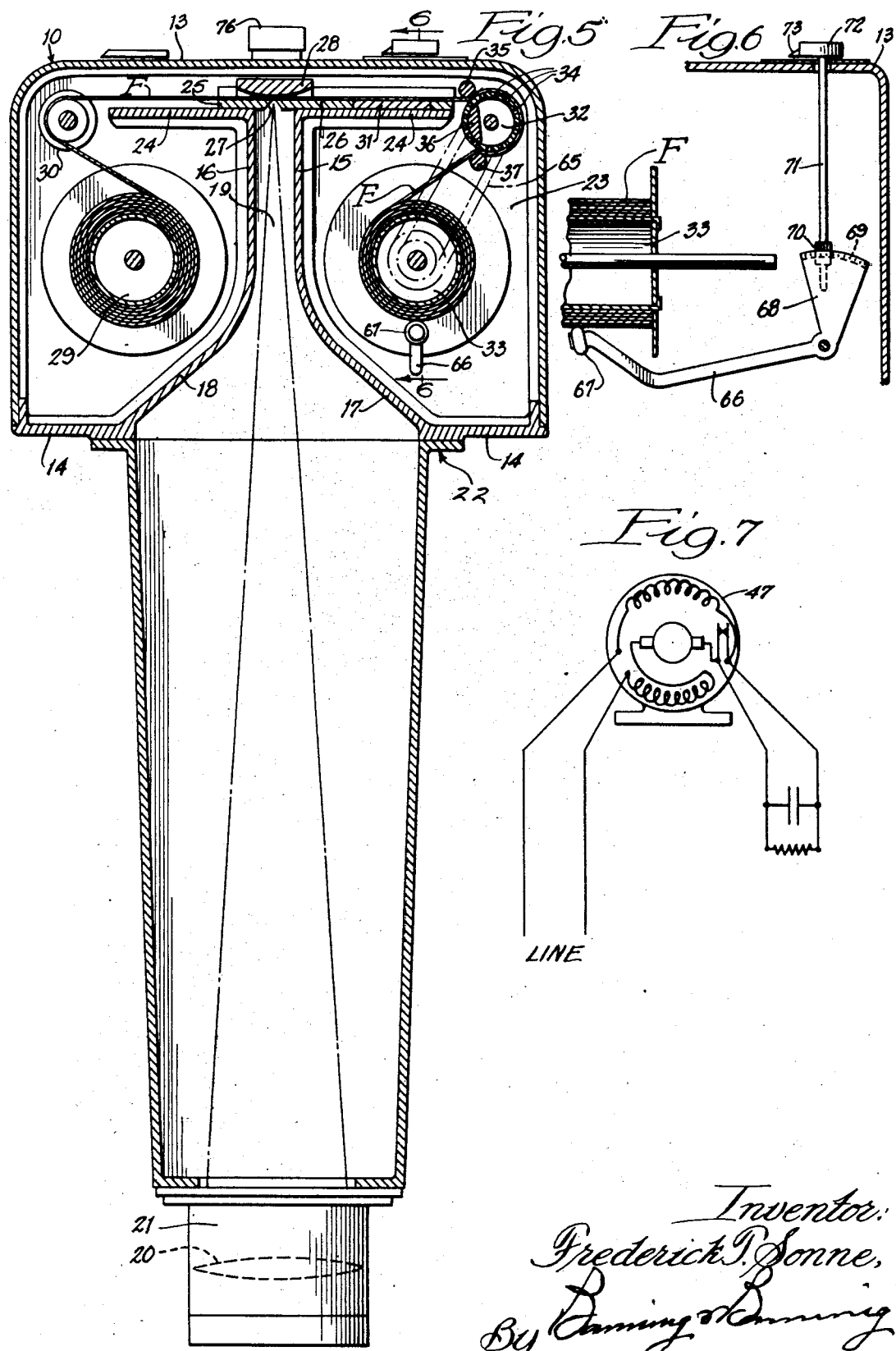
Inventor:
Frederick T. Sonne,
By Banning & Banning
Attorneys.

Jan. 5, 1943. F. T. SONNE 2,307,646
CAMERA
Filed Oct. 26, 1940 4 Sheets-Sheet 4
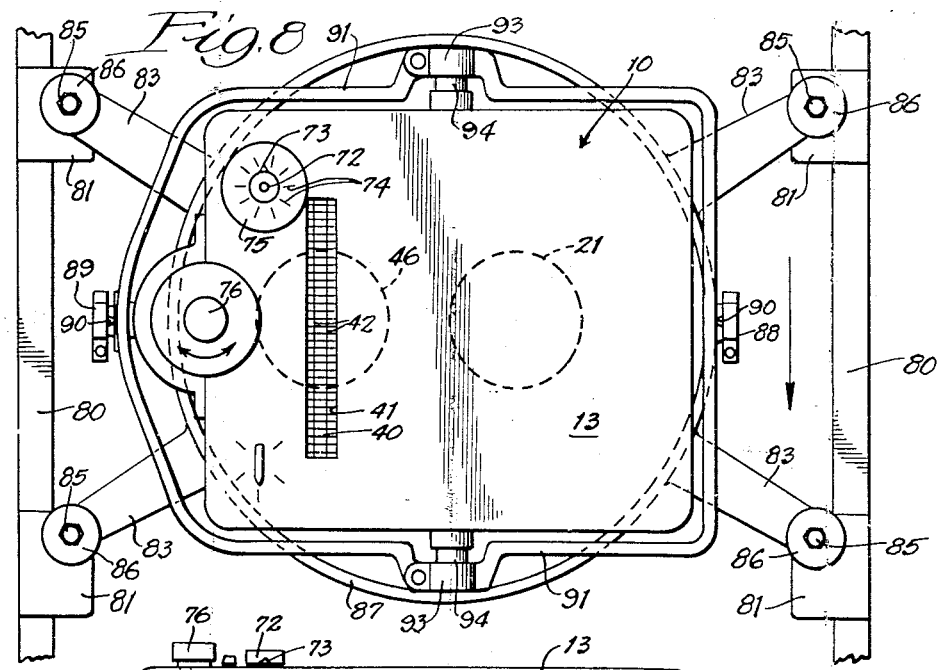
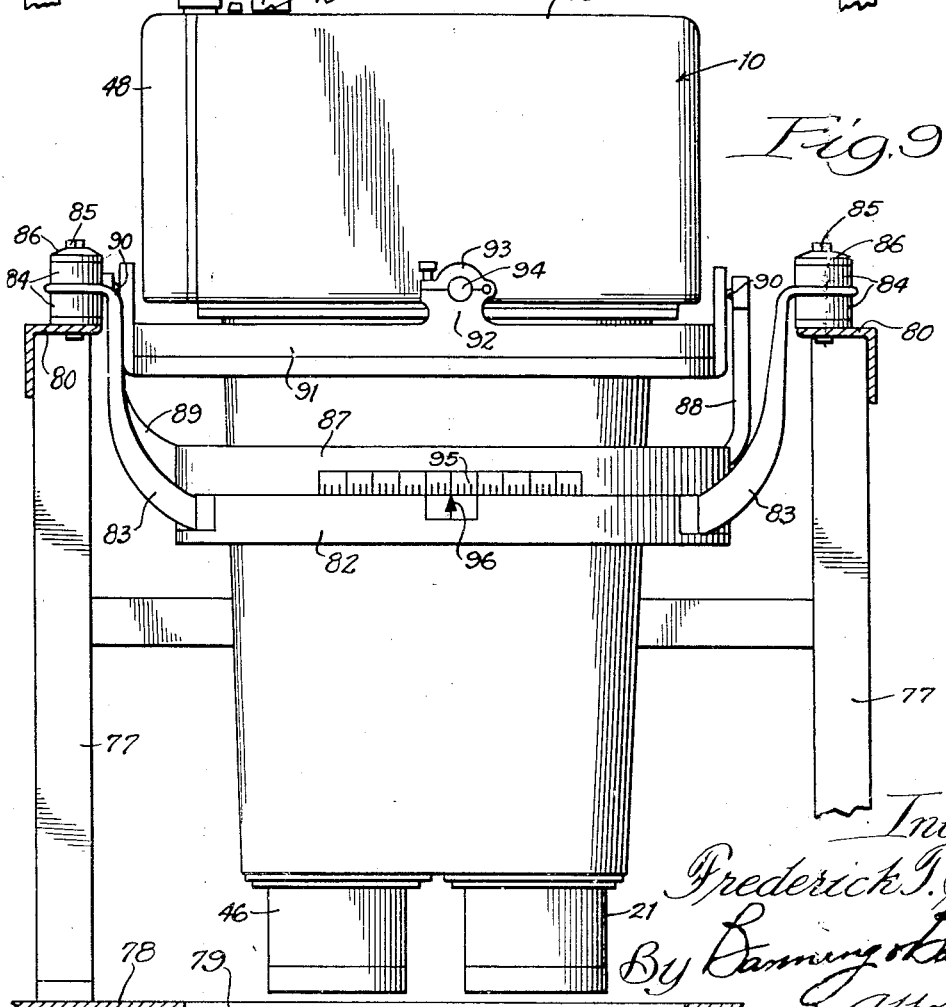
Inventor
Frederick T. Sonne,
By Banning & Banning
Attorneys.

Patented Jan. 5, 1943

2,307,646

UNITED STATES PATENT OFFICE 2,307,646

CAMERA

Frederick T. Sonne, Golf, Ill., assignor to Chicago Aerial Survey Company, a corporation of Illinois Application October 26, 1940, Serial No. 363,015

3 Claims. (Cl. 95—12.5)

The camera of the present invention is designed primarily though not exclusively for aerial photography, it being adaptable both for military and commercial purposes in the making of maps over an extended area.

Among the more essential objects of my invention the following are illustrative:

The provision of mechanism for correcting heretofore unavoidable photographic mistakes and inaccuracies due to parallactic displacement of the actual position of an object being photographed while the object and the camera are in relative motion.

The provision of viewing mechanism for producing a continuous clear, sharp and distortionless true-plan, still image of the object being photographed.

The provision of object viewing and picture taking mechanisms in which there is such coaction between the two as will insure production of a continuous, clear, sharp and distortionless true-plan still picture.

The provision of an organization of object viewing and picture taking mechanisms which is compact and adapted to be conveniently controlled by the camera-man from a central or common position.

The provision of an organization of object viewing and picture taking mechanisms in which readings taken from the viewing mechanism may be depended upon to show a correct photographic relationship between film strip and the object during continuous exposure of said strip.

The provision of a camera wherein all parts thereof are mounted as a unitary structure upon a common support so as to be capable of selective operation conjointly at any instant and for such period of time as is required for the taking of a continuous still picture of ground terrain.

Further objects and details will appear from the description of the invention in conjunction with the accompanying drawings, wherein—

Figure 1 is a perspective view of the rear or top side of the camera which in use will be projected downwardly toward an aperture in the floor of the plane;

Fig. 2 is a skeletonized view of the driving mechanism for advancing the sensitized film at a properly synchronized rate and concurrently feeding the indicator strip which affords the data for synchronizing the film speed with that of the projected image and correcting the angle of the camera to coincide with the line of flight;

Fig. 3 is a plan view of the camera, with the top removed to expose the interior thereof;

Fig. 4 is a sectional elevation taken on line 4—4 of Fig. 3;

Fig. 5 is a sectional elevation taken on line 5—5 of Fig. 3;

Fig. 6 is a detail taken on line 6—6 of Fig. 5 showing the indicator for registering the amount of film wound up on the receiving spool;

Fig. 7 is a wiring diagram for the motor which feeds the film and the indicator strip;

Fig. 8 is a top view showing the gimbals for mounting the camera to permit angular adjustment in any direction; and Fig. 9 is a side elevation of the camera.

The camera is housed within a rectangular casing 10, having side walls 11 and 12, a rear or top wall 13, and a lower or front wall 14. The interior of the casing is provided with spaced partition walls 15 and 16 which diverge laterally at their forward ends 17 and 18 to afford a throated passage 19 for the light rays focused by a lens 20 which is mounted at the lower end of a tube 21 provided around its upper end with a flange 22 which is connected to the lower wall 14 of the casing.

The partition walls 15 and 16 merge into a cross partition wall 23 which divides the casing into two sections, the first of which provides a mounting for the mechanisms involved in the exposure of the film, and the second of which affords a mounting for the indicator strip and associated mechanisms. The spaced partitions 15 and 16, at their upper ends merge into laterally extending plates 24 which lie in the same plane and afford a table top for the mounting of a fixed plate 25 and an adjustable plate 26, the contiguous inner edges of which plates are beveled at 27 to afford, in conjunction, a narrow slit or gap for the passage of the light rays to the sensitized film F, which is held in close adjacency with the light slit by a rounded shoe plate 28. The adjustment of the plate 26 permits the width of the slit to be varied.

The film is fed from a delivery spool 29 located within the space defined by the flared partition wall 18 and passes over an idler roll 30, and thence in contact with the aligned surfaces of the plates 25 and 26 and a wedge plate 31, and thence over a vacuum feed roll 32 to the takeup spool 33 which is located within the space defined by the flaring partition wall 17. The wedge plate is adjustable by a screw 31$^a$ having a calibrated knob 31$^b$ which enables the operator to accurately vary the width of the exposure slit.

With the lens 20 in focus with the ground image, a minute fraction of the image will at each succeeding instant be presented through the exposure gap to the synchronously traveling film, so that during each instant of exposure the film and the ground image will be relatively stationary to one another, which results in a progressive exposure of the film and the imprint of a sharply defined continuous image.

The vacuum feed roll 32 is provided in its surface with a multiplicity of apertures 34 which, when the roll is attached to a suitable suction device, will create a vacuum which serves to hold the film firmly against the roller surface so that no slippage can occur, and an even and uniform feeding of the film will be insured.

The film passes under a guide roll 35 which holds it in close adjacency to the surface of the feed roll, and an interior shoe 36 is provided which blocks off the vacuum on the delivery side of the feed roll, so that the film, after passing over a guide roll 37, will be freed from the pull of the vacuum and pass forwardly to the takeup roll 33. The feeding mechanism for the rolls and other associated mechanisms will be presently described in detail.

In order that the operator may have before him a constant image of the area presented to the sensitized film, I provide an elongated indicator strip 38 (Fig. 2) (endless or otherwise), having a run which passes between a clear glass plate 39 and a ground glass plate 40 having marked thereon a longitudinal line or lines 42 visible through an elongated window 41 in the rear or top of the camera casing. However, the longitudinal line might be inscribed on the indicator strip itself without modifying the nature of the visual indication presented to the eye of the operator.

The indicator strip is itself transparent and is provided with a plurality of uniformly spaced cross lines 43, or other suitable indicia which travel with the strip, and where an endless strip is employed it is fed around a power driven sprocket roll 44 which is axially aligned with the vacuum feed roll 32 and around an idler roll 45 which is axially aligned with the idler roll 30. It is not essential, however, that the strip be endless, since like results would attend the use of a strip fed from spool to spool in synchronous relation to the advance of the film, so that a light ray passing through a lens in a lens tube 46 will be focused upon the ground glass window plate 40, and will be subtended by the visible lines on the upper turn of the indicator strip and on the ground glass.

The result of this arrangement is that a traveling image of the ground area currently exposed through the camera slot will be presented to the eye of the operator, and so long as a given landmark on the ground maintains coincidence with a given calibrated spot on the indicator strip, the cameraman will know that the ground image is being accurately exposed and photographed on the moving sensitized film. If, however, a given landmark appears to move to the right or the left of the longitudinal line or advances or retreats with respect to the cross lines or equivalent markings on the indicator strip, the cameraman is informed of the fact that an adjustment of the camera is required to bring the given landmark back to its original position on the moving indicator strip.

Thus, if the plane turns to the right or the left, the index image will swerve inversely either to the left or right of its original position on the line, and likewise, if the feeding speed of the sensitized film is out of synchronism with the speed of advance of the ground image as presented to the camera, or if the plane tilts up or down, the image as seen on the indicator will appear to advance or retreat from its original position, which gives the information required in readjusting the feeding speed of the film.

For convenient reference it is usually desirable for the observer to center his eye upon some ground object, as for instance a road or railroad track which aligns with the longitudinal line or lines on the ground glass, and by proper angular adjustment of the camera to prevent the shifting of said landmark away from the longitudinal position by suitable adjustments from time to time to compensate for erratic movements of the aeroplane.

If for instance in military observations it is desirable to photograph a railroad track in enemy territory the plane pilot will endeavor to maintain a course immediately above the railroad track and at the elevation required, while the photographer keeps the image of the railroad in the center position by proper angular adjustments of the camera and compensates for the variations of ground speed by the necessary regulation of the feeding speed of the film. The means provided for effecting such compensating adjustments will now be described.

The film and indicator strip are fed at uniform speed through power derived from a variable speed motor 47 which is housed within a protuberant shell 48 at the right hand end of the casing and which, through suitable reduction gearing in a gear box 49, drives a shaft 50 provided with a spiral gear 51 meshing with a spiral gear 52 on a primary transmission shaft 53 provided at its opposite end with a spiral gear 54 meshing with a spiral gear 55 on a secondary transmission shaft 56 which is provided with a spiral gear 57 meshing with a spiral gear 58 surrounding and rigidly secured to a sleeve 59 having on its inner end a clutch head 60. The sleeve may be moved in and out by means of a rod 61 carrying a button 62 within convenient reach of the operator. The driving head 60 is adapted to engage with a driven clutch head 63 which is carried by the shaft which mounts the vacuum feed roller 32 which draws forward the sensitized film F.

The arrangement is one which permits the indicator strip to be driven independently of the sensitized film when the clutch members are released, in order to enable the operator to take suitable observations of the ground area traversed, without beginning to take the continuous photograph until the area to be photographically mapped comes within proper range of the indicator strip, after which, by throwing the clutch, the indicator strip and sensitized film will move in unison, so that the operator will at all times have a visual record of the film section currently traversing the exposure gap.

The endless indicator strip also passes over the idler roller 45 mounted on the end of the shaft for the roller 30, around which the film travels in its passage to the takeup spool 33 which is driven by a spring belt 65 carried around suitable pulleys on the positively driven feed roll 32 and the takeup spool 33, slippage being permitted to compensate for the progressive building up of the diameter of the exposed film on the takeup spool.

In order to maintain a continuing record of the amount of film exposed, a lever arm 66 is provided which at its free end carries a roller 67 which rides upon the surface of the film roll, and the lever at its opposite end is provided with a segment 68 having rack teeth 69 meshing with a pinion 70 on a shaft 71 extending outwardly through the top wall of the casing and provided with a disk 72 having a pointer 73 which coacts with a ring of indicator marks 74 on a dial 75, so that as the diameter of the film roll increases the pointer 73 will gradually turn to indicate the amount of film which has been exposed.

The variable speed motor is of any suitable standard form which may be wired in conformity with the diagram shown in Fig. 7, or in any other suitable manner, and which is adjustable as to speed by the turning of a button 76 within convenient reach of the operator, so that by suitable adjustments the feeding speed of the sensitized film and the indicator strip can be controlled.

The camera as a whole is mounted upon a frame comprising standards 77 which rest directly upon the base 78 of the aeroplane fuselage in proper position to bring the lenses of the camera directly above an aperture 79 through which an unobstructed view of the ground is obtained. The standards are connected at their upper ends by angle bars 80 provided with inwardly projecting lugs 81 which provide mountings for a suspended base ring 82 which is hung from bracket arms 83 mounted between upper and lower cushion disks 84 held in place by suitable through bolts 85 and cap washers 86, which bolts are entered through the lugs 81 so that a firm base support is afforded for the camera, which, however, is cushioned against vibrations by the disks 84, which are made of rubber or the like.

The base ring 82 surrounds the lower portion of the camera and affords a direct mounting for a rotatable adjustable ring 87, which is provided with diametrically spaced arms 88 and 89 provided with trunnion points 90 which provide a gimbal mounting for a tilting frame 91, which surrounds the medial portion of the camera and is provided on each side in a fore and aft direction with a boss 92 provided with a pivoted clamping head 93 which, in conjunction with the boss, affords a journal mounting for a trunnion 94 outwardly projecting from the adjacent wall of the camera casing.

The rotatable adjustable ring 87 is provided with a series of calibrations 95 which register with a pointer 96 on the base ring 82, so that the operator can turn the ring 87, with the parts supported thereby, to set the camera in angular relation to the longitudinal axis of the plane which is represented by the pointer 96.

Operation

With the aeroplane in flight, and approaching the area to be photographed, the photographer will first of all start the motor and adjust its speed as nearly as possible into synchronous relation to the speed of the plane, taking due account of the altitude and the speed at which the visible image of the landscape will move across the exposure aperture of the camera. In such preliminary adjustments it is also necessary to take due account of the lateral drift of the plane due to any wind blowing crosswise to the course of the aeroplane and to rotate the camera to the degree necessary to maintain the fore and aft axis of the camera in coincidence with the actual line of flight rather than the axis of the plane.

In making these adjustments, the photographer will observe the progressively exposed topographical image on the ground glass, which will be constantly traversed by the calibrated indicator strip, and by observing conspicuous marks on the landscape and by more precisely adjusting the speed of the motor it will be possible to bring the feeding speed into synchronism with the speed of the plane before the ground area to be photographed is reached.

At the proper time the photographer will depress the clutch button which imparts the desired feeding speed to the sensitized film, which will begin to move across the exposure gap at a rate coincident with the movement of the visible image, so that the film by minute increments will be exposed to the landscape below, each increment being relatively stationary to the visible image during the instant of exposure, so that a sharp cut and continuous image will be imprinted upon the film. As the exposure continues, the photographer will constantly observe the traveling image on the ground glass, and so long as the image maintains a fixed relationship with the calibrated indicator strip a correct exposure will be maintained on the sensitized film.

If, however, a given point in the observed image moves to the right or left of the center line on the ground glass, it will indicate that the plane has rolled to the right or left on its longitudinal axis, or turned right or left on its horizontal axis, and afford the necessary indication for the photographer to correct against such erratic movements by adjusting the camera to the left or right, as the case may be, until the index landmark regains its proper position.

If, on the other hand, the index landmark advances or retreats with respect to the markings on the indicator strip, the photographer will adjust against changes of speed or tilting of the plane until the image is again in proper register on the indicator strip.

By reason of the multiple adjustments afforded by the mounting for the camera and the variable speed of the motor, it is possible for the photographer to maintain a very accurate record image of the area traversed by the plane, with due and instant corrections for aberrations in the pointing of the camera resulting from the unavoidable erratic motions to which the plane is subjected. Thus, in following a straight railroad line, for instance, if no correction were made for the lateral rolling movements of the plane, the image recorded upon the sensitized film would present the appearance of a sinuous rather than a straight stretch of track, and in like manner, if correction were not made for the up and down tilting movements of the plane, the image would be erratically foreshortened so that its value as a topographic record would be seriously impaired.

The method of mounting the camera and the adjustments provided for enable instant compensation to be made against such inaccuracies, so that a true record of the ground area below the line of flight will be secured, which is of primary importance, particularly in military operations.

Although the apparatus has been described with particularity as to detail, it is not the intention, unless otherwise indicated in the claims, to limit the invention to the precise details shown, since variations can be made therein without departing from the spirit of the invention.

Also, although the camera and its mountings have been designed particularly for downward exposure from an aeroplane, it is not the intention that the use of the camera be thus limited, since it can be advantageously employed for lateral exposure from a moving ground vehicle or from a boat, ship, or the like.

Furthermore, although it is preferred to employ a constantly open exposure slit of the character described, the indicating features of the present invention can be successfully employed with a shutter camera having a shutter movement properly synchronized with the advance of the film, so that it will be understood that in the claims, unless otherwise limited, it is the intention to broadly cover an indicator strip of the general character described, and that its use is not confined to the particular kind of camera here shown.

I claim:

1. A camera for producing a continuous, true-plan, still photograph of ground terrain from an airplane in flight, said camera comprising a vertically disposed, manually tiltable casing rotatable about a vertical axis and having mechanism for visually imaging said terrain and disclosing any deviation of the visual image from a position indicative of a correct photographic relation of the camera to said terrain and including a screen at the top of the casing upon which said image is adapted to be projected, a continuously moving member in said casing and having a stretch disposed parallel to and visible through said screen, said member having spaced apart transverse lines disposed parallel to and visible through said screen and said screen having associated therewith longitudinal lines in coaction with said transverse lines to indicate by the position of said image said correct photographic relation of the camera to said terrain, said longitudinal lines also disposed parallel to the fore and aft axis of said camera, means upon the casing for controlling the speed of said continuously moving member to neutralize the visual image movement of said terrain, and mechanism upon the casing for imaging the terrain upon a continuously moving film strip contained in the casing and for applying the neutralized correction to said strip.

2. A camera for producing a continuous, true-plan, still photograph of ground terrain from an airplane in flight, said camera comprising a vertically disposed manually tiltable and horizontally rotatable casing having mechanism for visually imaging said terrain and disclosing any deviation of the visual image from a position indicative of a correct photographic relation of the camera to said terrain and including a screen at the top of the casing upon which said image is adapted to be projected, a continuously moving member having a stretch disposed parallel to said screen, said member having spaced apart transverse lines disposed parallel to and visible through said screen and said screen having associated therewith longitudinal lines in coaction with said transverse lines to indicate by the position of said image said correct photographic relation of the camera to said terrain, said longitudinal lines also disposed parallel to the fore and aft axis of said camera, means upon the casing for controlling the speed of said continuously moving member to neutralize the visual image movement of said terrain, and mechanism carried by the casing for imaging the terrain upon a continuously moving film strip contained in the casing and for applying the neutralized correction to said strip, said film strip moving in a plane parallel to the direction of motion of said continuously moving member.

3. A camera designed to be mounted on an airplane in flight for taking a continuous picture of the ground terrain, said camera having a sight aperture at its top and an indicating line parallel with the indicated line of flight visible at said aperture, and having a downwardly directed exposure aperture, means for supporting a photographic film so as to dispose a portion thereof for continuous travel parallel with the terrain across the exposure aperture, means including a driven indicating element for visually imaging the terrain over which the plane is flying, said element having a portion arranged to travel parallel with said portion of the film in line with the sight aperture and provided with transverse indicating lines, means for imaging on the film the terrain over which the plane is flying, means for driving the driven element at a speed proportionate to the speed of the plane for producing a terrain image visible at the sight aperture, a clutch device whereby the film supporting means may be coupled to the driving means and operated to move the film in synchronism with the driven element and so as to give the film and the image thereon simultaneous movement at the point of incidence, and means for moving the film, the visual image producing means and the photographic image producing means in unison to different angles relative to the plane to maintain the film parallel with the terrain and the axes of the image producing means in line with the selected course when the plane deviates from a normal flying position relative to the terrain.

FREDERICK T. SONNE.